United States Patent
Inagaki et al.

(10) Patent No.: US 7,470,212 B2
(45) Date of Patent: Dec. 30, 2008

(54) SHIFT CONTROL APPARATUS FOR AUTOMATIC TRANSMISSION

(75) Inventors: Nobuaki Inagaki, Anjo (JP); Eiji Ito, Anjo (JP)

(73) Assignee: Aisin Aw Co., Ltd. (JP)

( * ) Notice: Subject to any disclaimer, the term of this patent is extended or adjusted under 35 U.S.C. 154(b) by 91 days.

(21) Appl. No.: 11/167,553

(22) Filed: Jun. 28, 2005

(65) Prior Publication Data
US 2006/0003867 A1    Jan. 5, 2006

(30) Foreign Application Priority Data
Jul. 1, 2004 (JP) .............................. 2004-195842

(51) Int. Cl.
*B60W 10/10* (2006.01)
(52) U.S. Cl. ...................... 477/111; 477/107
(58) Field of Classification Search ................ 477/107, 477/110, 111; 701/55, 56
See application file for complete search history.

(56) References Cited

U.S. PATENT DOCUMENTS

| | | | |
|---|---|---|---|
| 5,921,886 A * | 7/1999 | Takada et al. ............... | 477/110 |
| 6,432,015 B1 * | 8/2002 | Takahashi .................... | 475/116 |
| 6,656,087 B1 * | 12/2003 | Runde et al. ................. | 477/107 |
| 6,749,534 B2 | 6/2004 | Watanabe et al. ........... | 477/107 |

FOREIGN PATENT DOCUMENTS

| | | |
|---|---|---|
| JP | 05-338469 | 12/1993 |
| JP | 07-195963 | 8/1995 |
| JP | 10-131778 | 5/1998 |

* cited by examiner

*Primary Examiner*—Roger L Pang
*Assistant Examiner*—Derek D Knight
(74) *Attorney, Agent, or Firm*—Bacon & Thomas, PLLC

(57) ABSTRACT

An engine output controller includes a delay timer which measures the period of time elapsed from a timing of a target hydraulic pressure of a release side hydraulic pressure, and control starts a predetermined period of time after a predetermined amount of torque increase is achieved. The engine output control stores maps of the predetermined periods of time and the amounts of torque increase corresponding to normal shifts, such as 3rd to 2nd and 4th to 3rd, and skip-shifts, such as 4th to 2nd, and selects the map corresponding to the type of downshift.

8 Claims, 11 Drawing Sheets

FIG.2

|   | C-1 | C-2 | C-3 | B-1 | B-2 | B-3 | B-4 | B-5 | F-1 | F-2 |
|---|---|---|---|---|---|---|---|---|---|---|
| 1ST | O |  |  |  |  | (O) |  | O |  | O |
| 2ND | O |  |  | (O) | O |  |  | O | O |  |
| 3RD | O |  |  | (O) | O |  | O |  | O |  |
| 4TH | O |  | O | (O) | O |  |  |  | O |  |
| 5TH | O | O | O |  | ● |  |  |  |  |  |
| REV |  | O |  |  |  | O |  | O |  |  |

(O) DURING ENGINE BRAKING,
● APPLIED BUT NO TORQUE TRANSMITTED

Time chart (WITH RELEASE SIDE CONTROL)

FIG. 11

|  | SHIFT TYPE |  |
|---|---|---|
| DELAY TIMER $t_{E1}$ [msec] | 3-2 | 250 |
|  | 4-3 | 250 |
|  | 4-2 | 150 |
| INCREASE TORQUE AMOUNT $T_{MD}$ [Nm] | 3-2 | 100 |
|  | 4-3 | 70 |
|  | 4-2 | 50 |

SHIFT CONTROL APPARATUS FOR AUTOMATIC TRANSMISSION

CROSS-REFERENCE TO RELATED APPLICATION

This application claims, under 35 USC 119, priority of Japanese Application No. 2004-195842 filed Jul. 1, 2004, the teachings of which are incorporated by reference herein in their entirety, inclusive of the specification, claims and drawings.

BACKGROUND OF THE INVENTION

1. Field of the Invention

The present invention relates to a shift control apparatus for an automatic transmission. More particularly, the present invention relates to a shift control apparatus which performs a downshift when an accelerator is off (i.e., during power-off), more specifically, which controls engine output during a downshift.

2. Description of the Related Art

Typically in a vehicle having an automatic transmission, when sufficient engine braking force is unable to be obtained when the accelerator is off (i.e., power-off), when traveling down a slope or the like, a driver routinely downshifts by either shifting a shift lever from the D-range to the S-range or $1^{st}$-range, or by operating a manual shift device to obtain the desired engine braking force. Also, automatic transmissions, recently designed to keep the lock-up clutch applied to the extent possible, downshift in response to deceleration when coasting (i.e., power-off) at a predetermined speed and keep the engine in a driven state (in which the rotation of the wheels drive the engine, instead of the engine driving the wheels) at idling speed or faster for a long time in an attempt to improve fuel efficiency.

During such a power-off downshift there is a time lag between start of the transmission of torque on the output side to the engine by application of a frictional engagement device (i.e., a clutch or brake) for the shift and the point in time when the engine speed increases, relative to the input shaft speed. Thus, as the shift duration increases so does the friction energy expended by the frictional engagement device, causing its friction elements to wear faster. Conventionally, to eliminate this problem, a shift control apparatus shortens the shift duration while suppressing shift shock by increasing engine output when a predetermined timed period has passed after start of timing in a power-off downshift (see Japanese Patent Application Laid Open ("Kokai") No. 5-338469). The shift control apparatus disclosed in this publication changes the duration of the timed predetermined period in accordance with changes in the hydraulic temperature and the engine speed in order to prevent, for example, conveyance of an adverse sensation to the driver due to an increase in drive torque or the like. It also assures sufficient reduction in shift duration, notwithstanding any offset of the timing of engine racing by a delay in the apply or release of the frictional engagement devices or a delay in the change in engine output.

However, even if engine output is appropriately increased with accurate timing in a predetermined downshift of, for example, 3rd speed to 2nd speed, by changing the duration of the timed predetermined period, it is still difficult to optimally adapt such control to all downshifts. In particular, in a skip shift from 4th speed to 2nd speed, for example, the offset in the timing of engine racing is due more to the type of shift than it is due to external factors such as hydraulic temperature, in which case the engine output increase control may not be initiated at the appropriate time. In particular, in an automatic transmission to which a manual operating device has been added, power-off downshifts are frequently performed by manual operation. At such time, a variety of types of shifts such as normal shifts and skip shifts are possible. Therefore, engine control with inappropriate timing and with an inappropriate amount of torque increase may place the engine in a driving (i.e., power-on) state, which may convey an uncomfortable sensation to the driver or generate shift shock.

SUMMARY OF THE INVENTION

In view of the foregoing problems, the present invention provides a shift control apparatus ("controller") for an automatic transmission, which controller is capable of always performing appropriate engine output control, regardless of what type of downshift is performed.

According to a first aspect, the present invention provides control of the increase in engine output, which is always appropriate for the particular downshift by selecting and executing an engine output increase control scheme which is stored in memory in correlation with the type of downshift. Furthermore, duration of a power-off downshift is reduced without any adverse sensation caused by an excessive increase in engine torque.

According to a second aspect of the present invention, engine output control is performed with start of timing that is always appropriate for the type of downshift.

According to a third aspect, the present invention provides engine output control which increases the engine output by an amount that is always appropriate for the type of downshift.

According to a fourth aspect, the present invention changes both the start of timing of the engine output control and the amount of increase of the engine output. As a result, engine output control which is appropriate overall can be selected according to the type of downshift. For example, in the case of a skip downshift, as compared with a normal downshift, the start of timing is advanced and the increase in the amount of engine output is reduced.

According to a fifth aspect, the present invention controls a so-called clutch-to-clutch downshift using release side hydraulic pressure and apply side hydraulic pressure, by changing the start of timing of the engine output control according to the type of downshift, using as a reference, for example, the point in time at which the release side hydraulic pressure decreases to a target hydraulic pressure.

According to a sixth aspect, the present invention, which is applied to a case in which the release side is a one-way clutch, and the start of timing of the engine output control is changed according to the type of downshift, using as a reference, for example, a point in time after a predetermined period of time has passed after the start of shift control.

According to a seventh aspect of the present invention, different engine output increase control schemes for normal downshifts and skip-downshifts are stored, and engine output control appropriate for a given downshift, regardless of whether that downshift is a normal downshift or a skip downshift, is always selected.

BRIEF DESCRIPTION OF THE DRAWINGS

FIG. 2 is a clutch and brake application chart for the automatic transmission shown in FIG. 1;

FIG. 11 is a map of the amounts of torque increase and various start timings for engine output control for each shift type.

DETAILED DESCRIPTION OF THE PREFERRED EMBODIMENTS

Preferred embodiments of the present invention will hereinafter be described with reference to the appended drawings.

Figure 1:
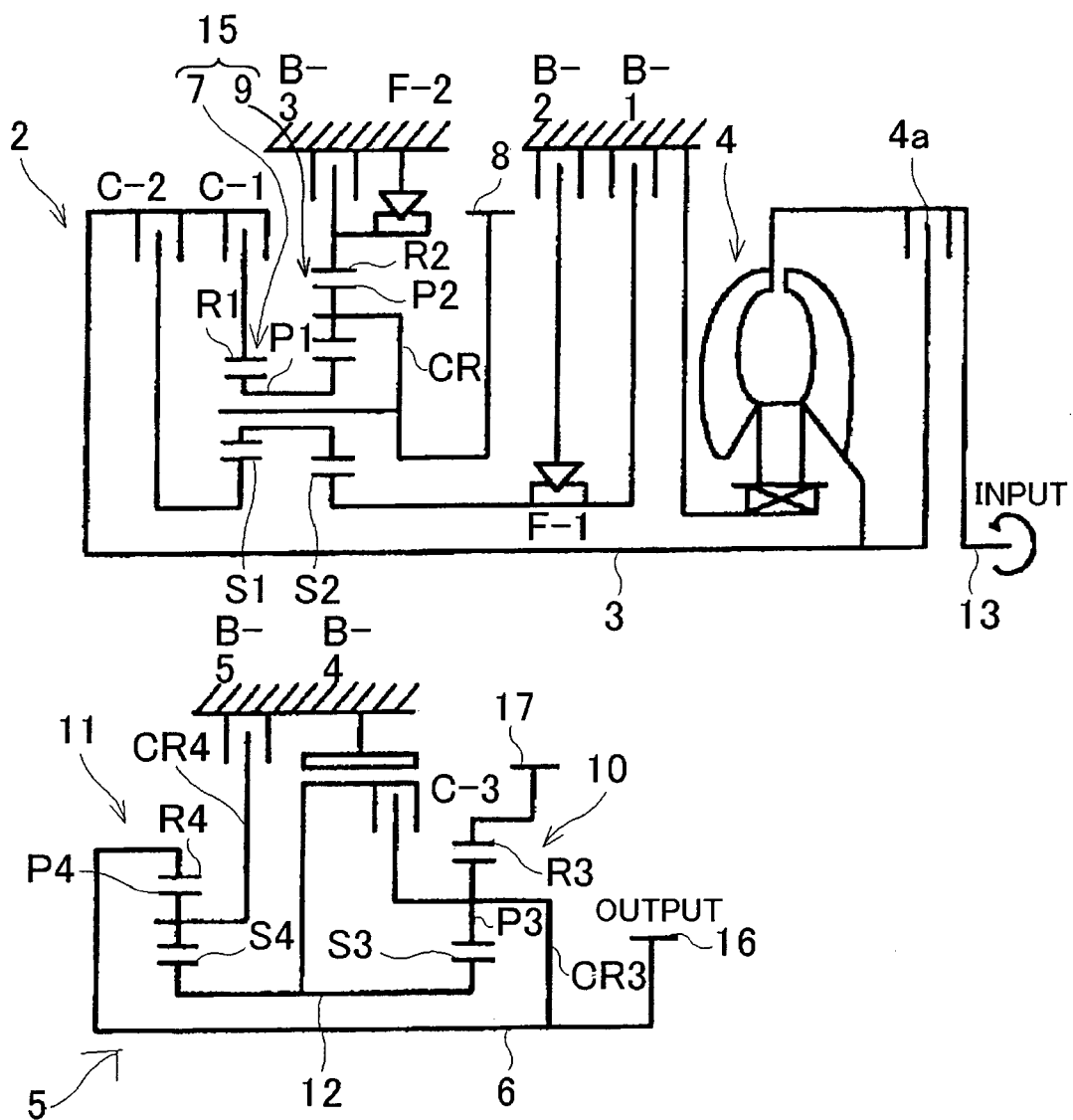
FIG. 1 is a schematic diagram of an automatic transmission to which the present invention can be applied.

FIG. 1 shows a five-speed automatic transmission 1 as including a torque converter 4, a three-speed main speed change mechanism 2, a three-speed auxiliary speed change mechanism 5, and a differential (not shown), all of which are joined together and housed in an integrated ("integral") case. The torque converter 4 is provided with a lock-up clutch 4a and transmits rotational force from an engine crankshaft 13 to an input shaft 3 of the main speed change mechanism 2, either via hydraulic fluid within the torque converter 4 or via a mechanical connection established by engagement of the lock-up clutch. The first shaft 3 (more specifically, the input shaft) which is aligned with the crankshaft 13, a second shaft 6 (a counter shaft) which is parallel to the first shaft 3, and a third shaft (a differential left/right output shaft) are all rotatably supported in the integrated case. A valve body is also provided on the outside of the case.

The main speed change mechanism 2 has a planetary gear unit 15 which includes a simple planetary gear unit 7 and a double pinion planetary gear unit 9. The simple planetary gear unit 7 includes a sun gear S1, a ring gear R1, and a carrier CR which supports long pinions P1 which are in mesh with the sun gear S1 and the ring gear R1. The carrier CR is a common (shared) carrier which also serves as the carrier for the double pinion planetary gear unit 9. In addition, the pinions P1 are common (shared) pinions which also serve as pinions in the double pinion planetary gear unit 9. The double pinion planetary gear unit 9 includes a sun gear S2, a ring gear R2, and the carrier CR which also supports pinions P2, in addition to the pinions P1. The pinions P1 are in mesh with the sun gear S2, and the pinions P2 are in mesh with the ring gear R2.

The input shaft 3 which is connected to the engine crankshaft 13 via the torque converter 4 can be connected to the ring gear R1 of the simple planetary gear unit 7 via a first (forward) clutch C-1, as well as to the sun gear S1 of the simple planetary gear unit 7 via a second (direct) clutch C-2. The sun gear S2 of the double pinion planetary gear unit 9 can be braked directly by a first brake B-1, as well as braked by a second brake B-2 via a first one-way clutch F-1. Further, the ring gear R2 of the double pinion planetary gear unit 9 can be braked by a third brake B-3 as well as by a second one-way clutch F-2.

The common carrier CR is connected to a counter drive gear 8 which serves as an output member of the main speed change mechanism 2.

The auxiliary speed change mechanism includes, in order axially toward the rear of the counter shaft 6 which is the second shaft, an output gear 16, a first simple planetary gear unit 10, and a second simple planetary gear unit 11. The counter shaft 6 is rotatably supported by the integrated case via bearings. The first and second planetary gear units 10 and 11 together form a Simpson type planetary gearset.

Ring gear R3 of the first simple planetary gear unit 10 is connected to a counter driven gear 17 which is in mesh with the counter drive gear 8, and a sun gear S3 of the first simple planetary gear unit 10 is fixed to a sleeve shaft 12 which is rotatably supported by the counter shaft 6. Pinions P3 are supported by a carrier CR3 which is a flange that is integrally connected to the counter shaft 6. The other end of the carrier CR3 which supports the pinions P3 is connected to an inner hub of a U/D direct clutch C-3. Further, sun gear S4 of the second simple planetary gear unit 11 is also formed on the sleeve shaft 12 and is thereby connected to the sun gear S3 of the first simple planetary gear unit 10. A ring gear R4 of the second simple planetary gear unit 11 is connected to the counter shaft 6.

The U/D direct clutch C-3 is disposed between the carrier CR3 of the first simple planetary gear unit 10 and the connected sun gears S3 and S4. These connected sun gears S3 and S4 can be braked by a fourth brake B-4 which is a band brake. Further, a carrier CR4 which supports pinions P4 of the second simple planetary gear unit 11 can be braked by a fifth brake B-5.

Next, in order to describe the operation of the foregoing embodiment, the operation of the mechanical portion of this five-speed automatic transmission will first be described with reference to both FIG. 1 and the clutch and brake application chart of FIG. 2.

In first speed (1ST) in the D (drive) range, the forward clutch C-1 is applied and both the fifth brake B-5 and the second one-way clutch F-2 are applied so that the ring gear R2 of the double pinion planetary gear unit 9 and the carrier CR4 of the second simple planetary gear unit 11 are held against rotation. In this state, the rotation of the input shaft 3 is transmitted to the ring gear R1 of the simple planetary gear unit 7 via the forward clutch C-1 and the ring gear R2 of the double pinion planetary gear unit 9 is held so that the common carrier CR rotates at a much slower speed in the forward direction, while the sun gears S1 and S2 rotate idly in the reverse direction. That is, the main speed change mechanism 2 is in a first speed state with the slowed rotation being transmitted to the ring gear R3 of the first simple planetary gear unit 10 of the auxiliary speed change mechanism 5 via the counter gears 8 and 17. The auxiliary speed change mechanism 5 is placed in a first speed state by having the carrier CR4 of the second simple planetary gear unit 11 held against rotation by the fifth brake B-5. Thus, the slowed rotation of the main speed change mechanism 2 is slowed even further by the auxiliary speed change mechanism 5, after which it is output from the output gear 16.

In second speed (2ND), the second brake B-2 is applied in addition to the forward clutch C-1, and the first one-way clutch F-1 is applied instead of the second one-way clutch F-2, while the fifth brake B-5 continues to be held. In this state, the sun gear S2 is held against rotation by both the second brake B-2 and the first one-way clutch F-1, such that the rotation of the ring gear R1 of the simple planetary gear unit 7, which is transmitted from the input shaft 3 via the forward clutch C-1, makes the carrier CR rotate in the forward direction at a slower speed while the ring gear R2 of the double pinion planetary gear unit 9 rotates idly in the forward direction. This slowed rotation is then transmitted to the auxiliary speed change mechanism 5 via the counter gears 8 and 17. That is, the main speed change mechanism 2 is in a second speed state while the auxiliary speed change mechanism 5 is in a first speed state due to engagement of the fifth brake B-5. As a result, this second speed state and first speed state combine together to achieve second speed for the automatic transmission 1 as a whole.

In third speed (3RD), the forward clutch C-1, the second brake B-2, and the first one-way clutch F-1 continue to be applied, while the fifth brake B-5 is released and the fourth brake B-4 is engaged instead. That is, the main speed change mechanism 2 is maintained in the same state that it was in second speed as described above, and that rotation is transmitted to the auxiliary speed change mechanism 5 via the counter gears 8 and 17. In the auxiliary speed change mechanism 5, however, the rotation from the ring gear R3 of the first simple planetary gear unit 10 is made second speed rotation by holding the sun gear S3 against rotation and the resulting rotation is output from the carrier CR3. As a result, both the main speed change mechanism 2 and the auxiliary speed change mechanism 5 are in second speed states, resulting in the automatic transmission 1 as a whole achieving third speed.

In fourth speed (4TH), the main speed change mechanism 2 is in the same state as it is in the second and third speed states described above, in which the forward clutch C-1, the second brake B-2, and the first one-way clutch F-1 are all applied. In the auxiliary speed change mechanism 5, on the other hand, the fourth brake B-4 is released while the U/D direct clutch C-3 is applied. In this state, the carrier CR3 and the sun gears S3 and S4 of the first simple planetary gear unit 10 are connected such that the planetary gears 10 and 11 rotate together as a single unit in direct drive rotation. As a result, the second speed state of the main speed change mechanism 2 and the direct drive rotation (i.e., third speed state) of the auxiliary speed change mechanism 5 combine together such that the automatic transmission as a whole outputs a fourth speed rotation from the output gear 16.

In fifth speed (5TH), the forward clutch C-1 and the direct clutch C-2 are applied such that the rotation of the input shaft 3 is transmitted to the sun gear S1 and the ring gear R1 of the simple planetary gear unit 7, and the gear unit of the main speed change mechanism 2 rotates as a single unit in direct drive rotation. Also, the auxiliary speed change mechanism 5 rotates in direct drive rotation with the U/D direct clutch C-3 applied. As a result, the third speed state (direct drive) of the main speed change mechanism 2 and the third speed state (direct drive) of the auxiliary speed change mechanism 5 combine together such that the automatic transmission as a whole outputs a fifth speed rotation from the output gear 16.

The circles within the parentheses in FIG. 2 indicate a state in which the engine brake is applied during coasting (in $4^{th}$, $3^{rd}$, or $2^{nd}$ range). That is, in first speed, the third brake B-3 is applied such that rotation of the ring gear R2, which was allowed by the second one-way clutch F-2 overrunning, is stopped. Also, in second speed, third speed, and fourth speed, the first brake B-1 is applied such that rotation of the sun gear S1, which was allowed by the first one-way clutch F-1 overrunning, is stopped. A solid black circle in the FIG. 2 indicates that the brake B-2 is applied, but no torque is being transmitted due to the fact that the one-way clutch F-1 is rotating freely or overrunning.

In R (reverse) range, the direct clutch C-2, the third brake B-3, and the fifth brake B-5 are all applied. In this state, the rotation of the input shaft 3 is transmitted to the sun gear S1 via the direct clutch C-2 while the ring gear R2 of the double pinion planetary gear unit 9 is held against rotation by the third brake B-3. As a result, the carrier CR rotates in the reverse direction while the ring gear R1 of the simple planetary gear unit 7 also rotates idly in the reverse direction. The reverse rotation of the carrier CR is then transmitted to the auxiliary speed change mechanism 5 via the counter gears 8 and 17. In the auxiliary speed change mechanism 5, rotation of the carrier CR4 of the second simple planetary gear unit 11 in the reverse direction is also stopped by the fifth brake B-5, such that the auxiliary speed change mechanism 5 is maintained in the first speed state. As a result, the reverse rotation of the main speed change mechanism 2 and the first speed rotation of the auxiliary speed change mechanism 5 combine so that a slowed rotation in the reverse direction is output from the output shaft 16.

Figure 3:
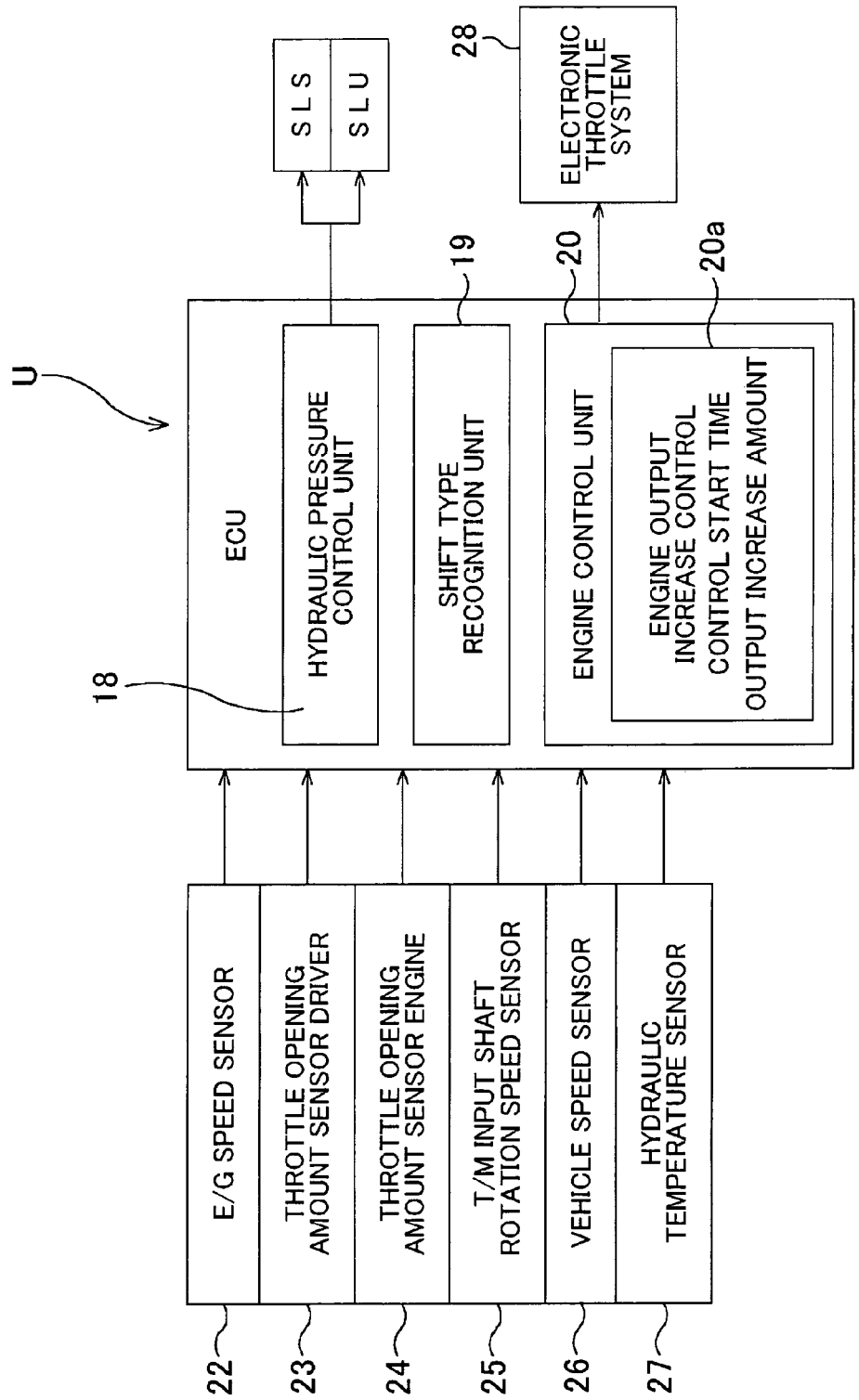
FIG. 3 is a block diagram of a shift controller according to the present invention.

FIG. 3 is a block diagram of an electrical control system including a control unit (ECU) U which is a microcomputer that receives various signals from an engine speed sensor 22, a throttle opening sensor 23 that detects the amount of depression of the accelerator pedal by the driver, a sensor 24 that detects the actual throttle opening, a sensor 25 that detects input shaft rotational speed (=turbine rotational speed) of a transmission (i.e., the automatic transmission), a vehicle speed (=automatic transmission output shaft rotational speed) sensor 26, and a hydraulic temperature sensor 27. This control unit U also outputs signals to an electronic throttle system (engine operating unit) 28 that controls engine throttle, and linear solenoid valves SLS and SLU in the hydraulic circuit of FIG. 4. This control unit U includes a release and apply side hydraulic pressure control unit 18 that sends a pressure regulating signal to the linear solenoid valve SLS or SLU, and an engine control unit 20 that sends a throttle opening amount command to the electronic throttle system 28. The control unit U is also provided with a unit 19 which recognizes the type of shift performed by the current shift control, and more particularly, the type of downshift such as 3rd to 2nd, 4th to 3rd, or 4th to 2nd, based on signals from the shift position sensor and the like.

Also, the engine control unit 20 stores various engine output increase control schemes 20a which differ according to the type of downshift. More specifically, the engine control unit 20 stores a map of amounts of increase ($T_{MD}$) of the engine output and start times ($t_{E1}$) for the engine output control according to the type of downshift. The engine control unit 20 then selects a start time and an amount of increase of engine output from the map, according to the type of downshift recognized by the recognition unit 19 and outputs an engine control signal indicative of the selected start time and the amount of increase of engine output to the electronic throttle system.

Figure 4:
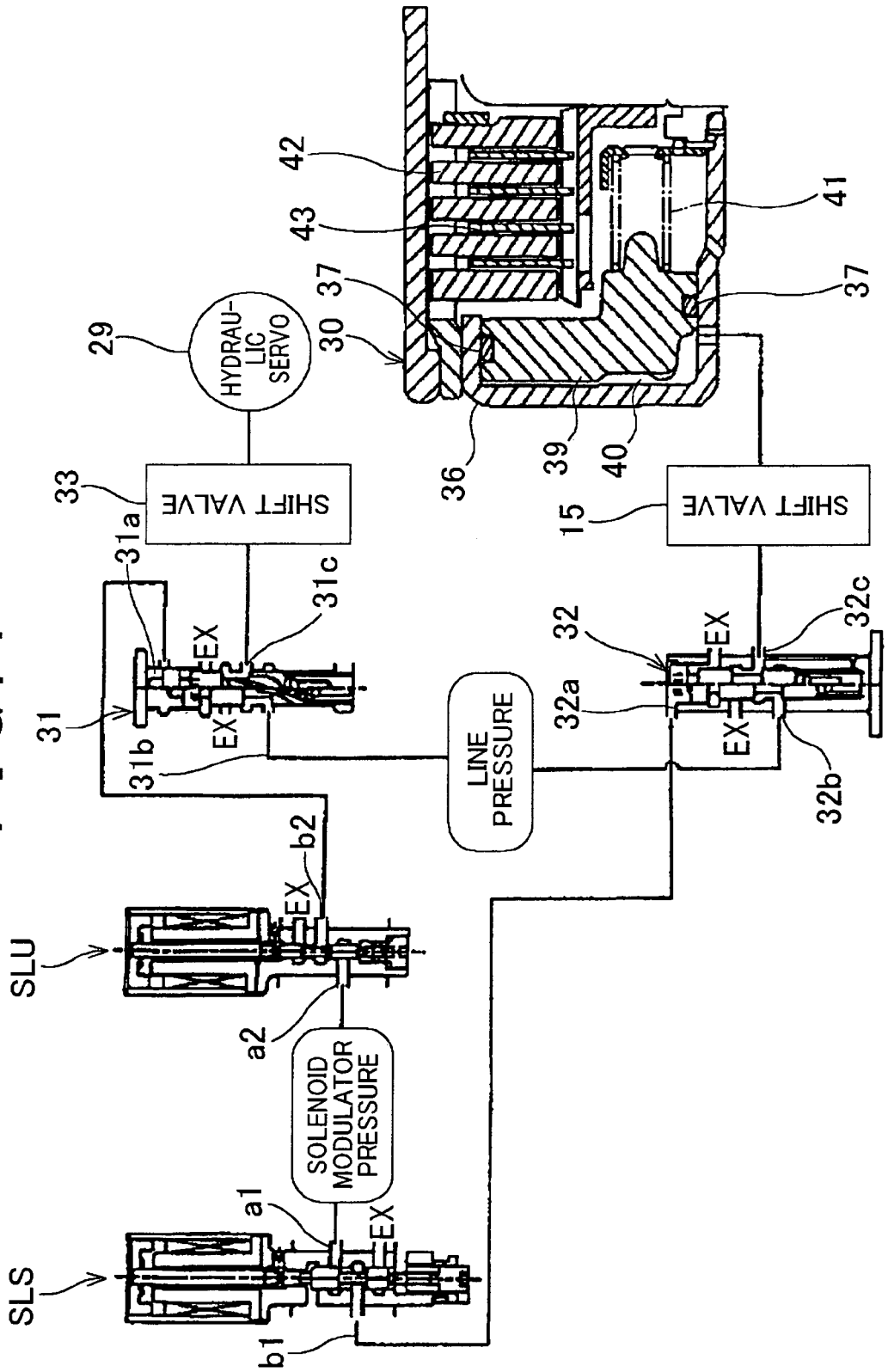
FIG. 4 is a schematic view of a hydraulic circuit controlled by the controller of FIG. 3.

FIG. 4 is a schematic diagram of a hydraulic circuit which includes the two linear solenoid valves SLS and SLU, as well as a plurality of hydraulic servos 29 and 30 which release/apply a plurality of frictional engagement elements (i.e., the clutches C-1 to C-3 and brakes B-1 to B-4) used to achieve five forward speeds and one reverse speed by switching the path of torque transmission through the planetary gear units of the automatic transmission. Also, a solenoid modulator pressure is supplied to input ports $a_1$ and $a_2$ of the linear solenoid valves SLS and SLU, and a control hydraulic pressure from output ports $b_1$ and $b_2$ of these linear solenoid valves is supplied to hydraulic control chambers 31a and 32a of pressure control valves 31 and 32. Line pressure is supplied to input ports 31b and 32b of the pressure control valves 31 and 32 and a regulated pressure from output ports 31c and 32c, as regulated by the control hydraulic pressure, is supplied appropriately to hydraulic servos 29 and 30 via shift valves 33 and 15.

The hydraulic pressure circuit shown in FIG. 4 is only meant to show the basic concept. The hydraulic servos 29 and 30 and the shift valves 33 and 15 are only representative. In reality, there are multiple hydraulic servos for the automatic transmission, as well as multiple shift valves for switching the hydraulic pressure between those hydraulic servos. Also the hydraulic servos such as that shown as hydraulic servo 30, each have a piston 39 fitted with an oil seal 37 to make it oil tight within a cylinder 36. This piston 39 moves against a return spring 41 in accordance with the hydraulic pressure as regulated by the pressure control valve 32 operating on hydraulic pressure chamber 40, and presses outside friction plate 42 into contact with an inside friction member 43. These friction plates and friction members are shown as a clutch, but may represent a brake as well.

To aid in understanding the shift control apparatus according to the present invention shown in FIGS. 5 and 6, the release side hydraulic pressure PA during a clutch-to-clutch downshift when power is off will first be described with reference to FIG. 7.

When the accelerator pedal is released (i.e., when the throttle opening θ≈0) and the shift lever is moved (downshifted) from the D range to the S or L range while traveling at a high speed, timing (time measurement) starts after a predetermined delay following a shift determination (start of shift control) (S1). At the shift control starting point (t=0), a control signal to bring the release side hydraulic pressure $P_A$ into conformance with an initial pressure $P_{T1}$ is output to the linear solenoid valve SLS (or SLU), while the release side frictional engagement element is in an applied state. That is, the release side hydraulic pressure $P_A$ at the applied side before the shift is the apply pressure $P_{T1}$, i.e., the line pressure, and a predetermined standby pressure $P_{T2}$ which will not produce a change in rotational speed of the input shaft is set. The release side hydraulic pressure $P_A$ is then swept down at a predetermined gradient $(P_{T1}-P_{T2}/t_{T4})$, from the initial pressure $P_{T1}$ toward the standby pressure $P_{T2}$, based on the time $t_{T4}$, which is set beforehand, with the point when timing started serving as a reference point (S2). This downsweep continues until the release side hydraulic pressure $P_A$ becomes equal to the standby pressure which is a predetermined low pressure, in a range that will not produce a change in the rotational speed of the input shaft (S3), and the release side hydraulic pressure $P_A$ is thereby set to the standby pressure $P_{T2}$ (S4).

The standby pressure $P_{T2}$ is maintained from the point when timing is started for a predetermined period of time $t_{SC}$ forward (S5). This predetermined period of time $t_{SC}$ is defined by a time $t_{SE}$ and a time $t_{SD}$ ($t_{SC}=t_{SE}-t_{SD}$). The time $t_{SE}$ is set beforehand by piston throttle control (i.e., control which moves the piston to a point immediately prior to contact with the friction members) of an apply hydraulic pressure, which will be described later. The time $t_{SD}$ is set beforehand in sync with the end of the apply side piston stroke control so as to reduce the release side hydraulic pressure.

A release side torque $T_A$ is then calculated as a function of input torque $T_t$ (S6). This input torque $T_t$ is obtained by first obtaining the engine torque based on the engine speed and the throttle opening from a map, then calculating a speed ratio from the input/output speed of the torque converter, obtaining a torque ratio from a map according to that speed ratio, and multiplying the torque ratio by the engine torque. At this time, the throttle opening is 0 so there is little input torque $T_t$, and although the release side torque $T_A$ can be obtained because the torque share and the like contribute to the input torque, the value of that release side torque $T_A$ is low.

Furthermore, a target hydraulic pressure $P_{T4}$ ($=P_{T3}$) for the release side is calculated based on the release side torque $T_A$ (S7). That is, when the friction coefficient× the number of plates× the piston area× effective radius of the release side frictional engagement elements is A and the release side piston stroke pressure (i.e., the return spring pressure) is B, the release side hydraulic pressure $P_A$ is calculated according to the equation $[P_A=(T_A/A)+B]$. Then, when the time this release side hydraulic pressure $P_A$ has been held at standby pressure $P_{T2}$ exceeds the predetermined period of time ($t_{SC}=t_{SE}-t_{SD}$), which is set beforehand, beginning with the start of shift control, the release side hydraulic pressure $P_A$ is rapidly reduced to the target hydraulic pressure $P_{T4}$ ($=P_{T3}$) which is a low pressure. The release side hydraulic pressure $P_A$ is then swept down at a predetermined gradient from the target hydraulic pressure $P_{T3}$ (S8) until the hydraulic pressure is drained, after which the release side hydraulic pressure control ends.

Figure 8:
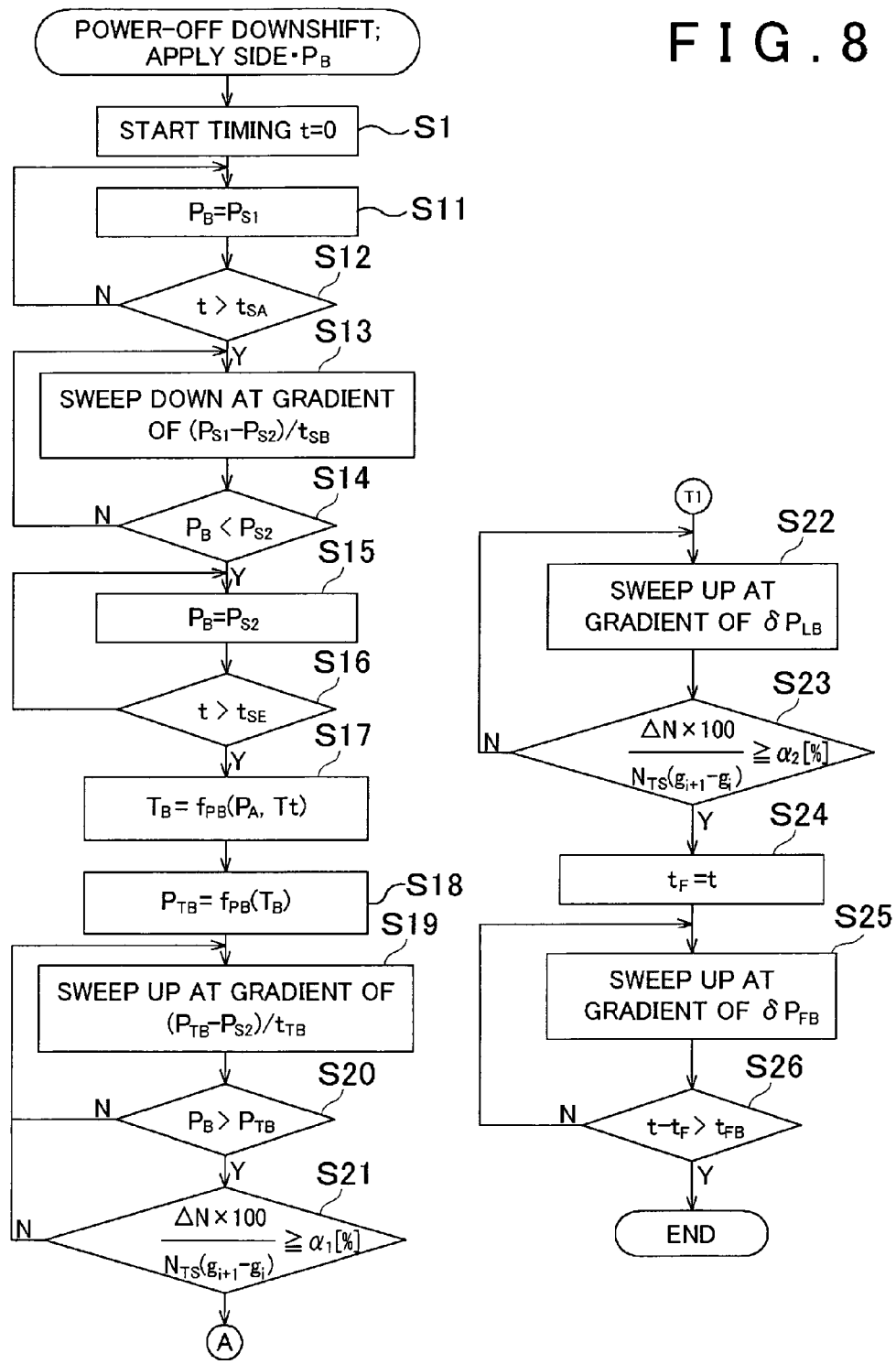
FIG. 8 is a flowchart of a routine for apply side hydraulic pressure control.

Meanwhile, with an apply side hydraulic pressure $P_B$, as shown in the flowchart in FIG. 8, timing starts (S1) at the same time that the shift control starts. Also at that time, a predetermined signal to make the apply side hydraulic pressure $P_B$ a predetermined pressure $P_{S1}$ is output to the linear solenoid valve SLS (or SLU) (S11), and the apply side hydraulic pressure $P_B$ is maintained at that predetermined pressure $P_{S1}$ for a predetermined period of time $t_{SA}$ (S12). The predetermined pressure $P_{S1}$ is the pressure necessary to move the piston 39, into contact with the friction members, i.e., a pressure that fills the hydraulic pressure chamber 20 of the hydraulic servo. When the predetermined period of time $t_{SA}$ has passed, the apply side hydraulic pressure $P_B$ is swept down at a predetermined gradient $[(P_{S1}-P_{S2})/t_{SB}]$ (S13). When the apply side hydraulic pressure $P_B$ reaches a predetermined low pressure $P_{S2}$ (S14), the downsweep is stopped and that predetermined low pressure $P_{S2}$ is maintained (S15). The predetermined low pressure $P_{S2}$ is set to a pressure that is equal to, or greater than, the piston stroke pressure, but which will not produce a change in the rotational speed of the input shaft. The predetermined low pressure $P_{S2}$ is maintained until a time t passes the predetermined period of time $t_{SE}$ (piston stroke control) (S16). That is, the start time $t_{SE}$ of the piston stroke control is delayed a predetermined period of time $t_{SD}$ from the set time $t_{SC}$ of the target hydraulic pressure $P_{T3}$ of the release side hydraulic pressure.

Next, a release side torque share $T_B$ is calculated as a function of the input torque $T_t$ and the release side hydraulic pressure $P_A$ (S17). Further, an apply side hydraulic pressure $P_{TB}$ just before the input rotational speed $N_T$ starts to change (i.e., just before the inertia phase starts) is calculated based on this release side torque share $T_B$ (S18). A predetermined gradient is then calculated $[(P_{TB}-P_{S2})/t_{TB}]$ from the predetermined period of time $t_{TB}$ set beforehand, based on the apply hydraulic pressure $P_{TB}$, and the apply side hydraulic pressure is then swept up based on that gradient (S19). As a result of this upsweep, the apply torque increases and the hydraulic pressure increases until a point immediately preceding start of change in the input rotational speed, i.e., until it reaches the calculated predetermined target apply hydraulic pressure $P_{TB}$ (S20).

This upsweep continues until the hydraulic pressure reaches the target apply hydraulic pressure $P_{TB}$, i.e., until it is estimated that the inertia phase has been entered, at which time the input shaft rotational speed starts to change, and until $\alpha_1$%, e.g., 10%, of the amount of change in rotation ΔN when the downshift is complete (S21). That is, the upsweep continues until $[(\Delta N \times 100)/N_{TS}(g_i+_1-g_i)]$ becomes $\alpha_1\%$, where $N_{TS}$ denotes the output shaft rotational speed at the start of the shift, $\Delta N$ denotes the amount of change in the input shaft rotational speed, $g_i+_1$ denotes the gear ratio before the shift, and $g_i$ denotes the gear ratio after the shift. Alternatively, instead of the upsweep continuing until $[(\Delta N \times 100)/N_{TS}(g_i+_1-g_i)]$ becomes $\alpha_1$, the upsweep may continue until the rotational speed increases a predetermined rpm amount from the rotational speed before the shift.

Also, when $[(\Delta N \times 100)/N_{TS}(g_i+_1-g_i)]$ exceeds $\alpha_1\%$, a different hydraulic pressure change $\delta P_{LB}$ is set by feedback control based on a smooth input shaft rotational speed change amount $\Delta N$, such that an upsweep is performed at a gradient of the $\delta P_{LB}$ (S22). The gradient $\delta P_{LB}$ is gentler than the hydraulic pressure increase to the target apply hydraulic pressure $P_{TB}$. This upsweep is continued until $\alpha_2\%$, e.g., 90%, of the speed change amount where the shift is close to being completed (S23).

When $\alpha_2\%$ of that speed change amount is reached, a timed time $t_F$ is set (S24). This state substantially corresponds to the state in which the inertia phase has ended. Furthermore, a relatively rapid hydraulic pressure change $\delta P_{FB}$ is set and the hydraulic pressure is rapidly swept up according to the change in hydraulic pressure (S25). The apply side hydraulic pressure control ends when a predetermined period of time $t_{FB}$, which is set to a time sufficient for the hydraulic pressure to rise to the apply pressure, has passed from the time $t_F$ (S26).

Figure 5:
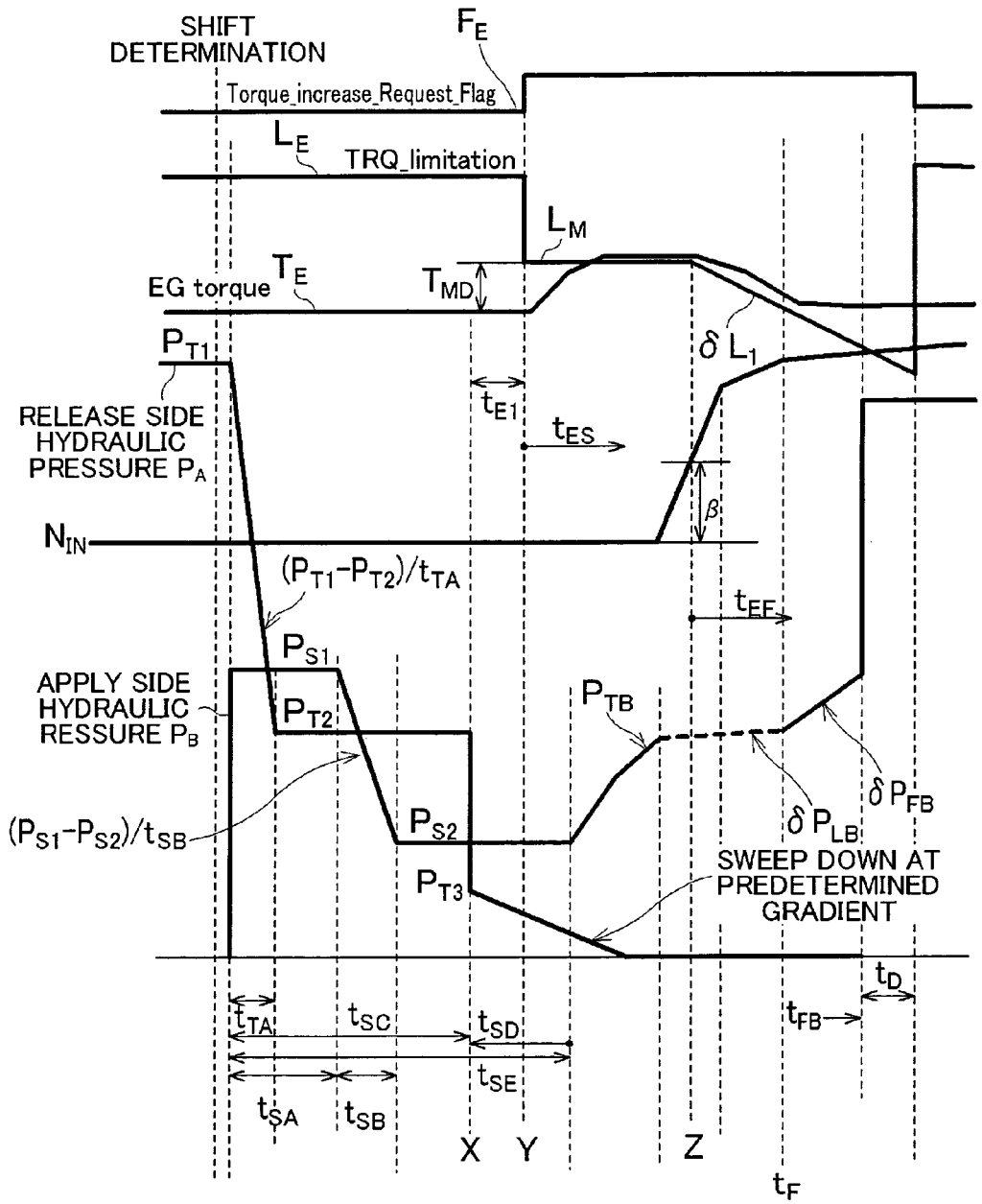
FIG. 5 is a time chart showing release side shift control according to the present invention.
Figure 6:
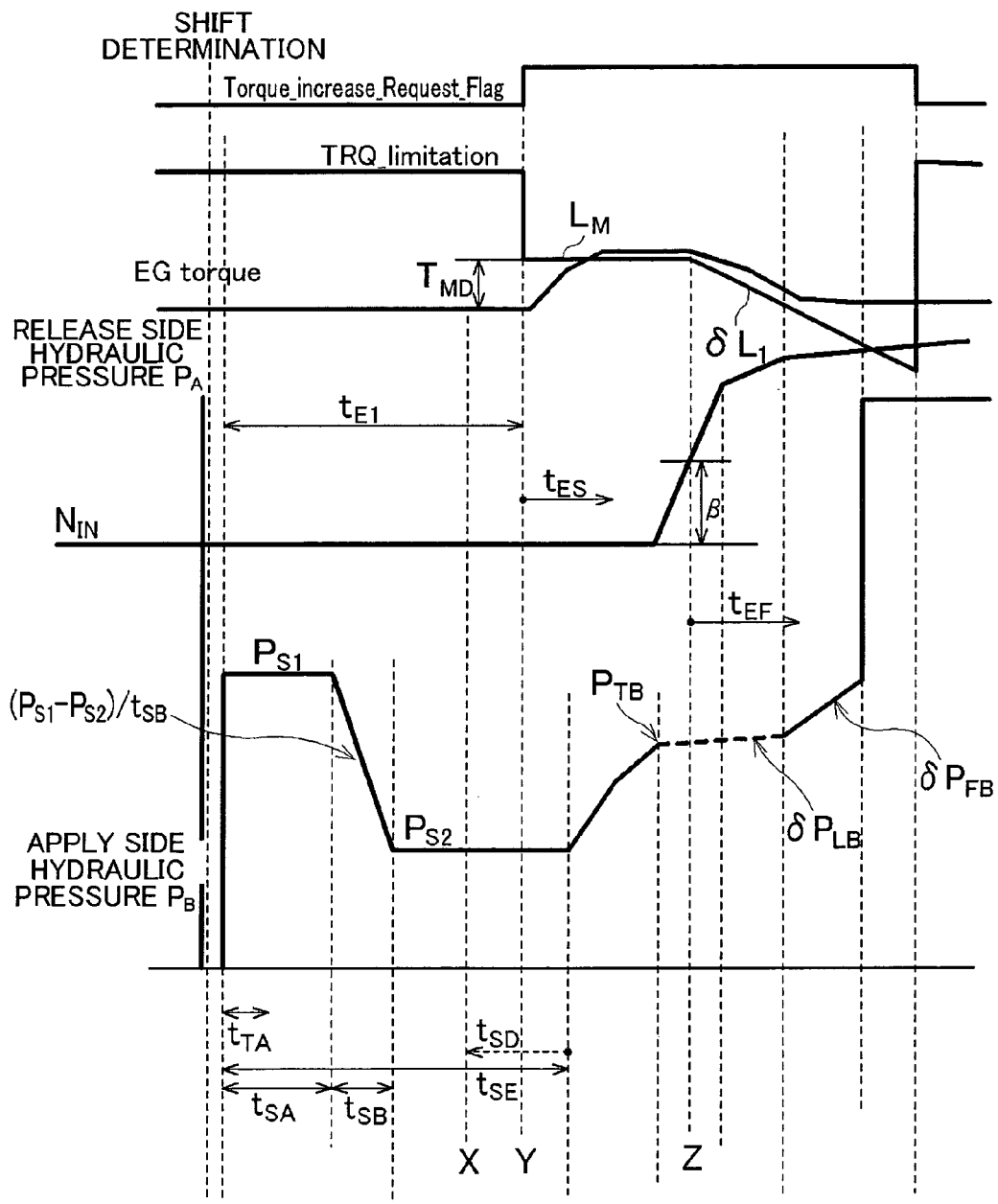
FIG. 6 is a time chart showing shift control according to the present invention when the release side is a one-way clutch.
Figure 7:
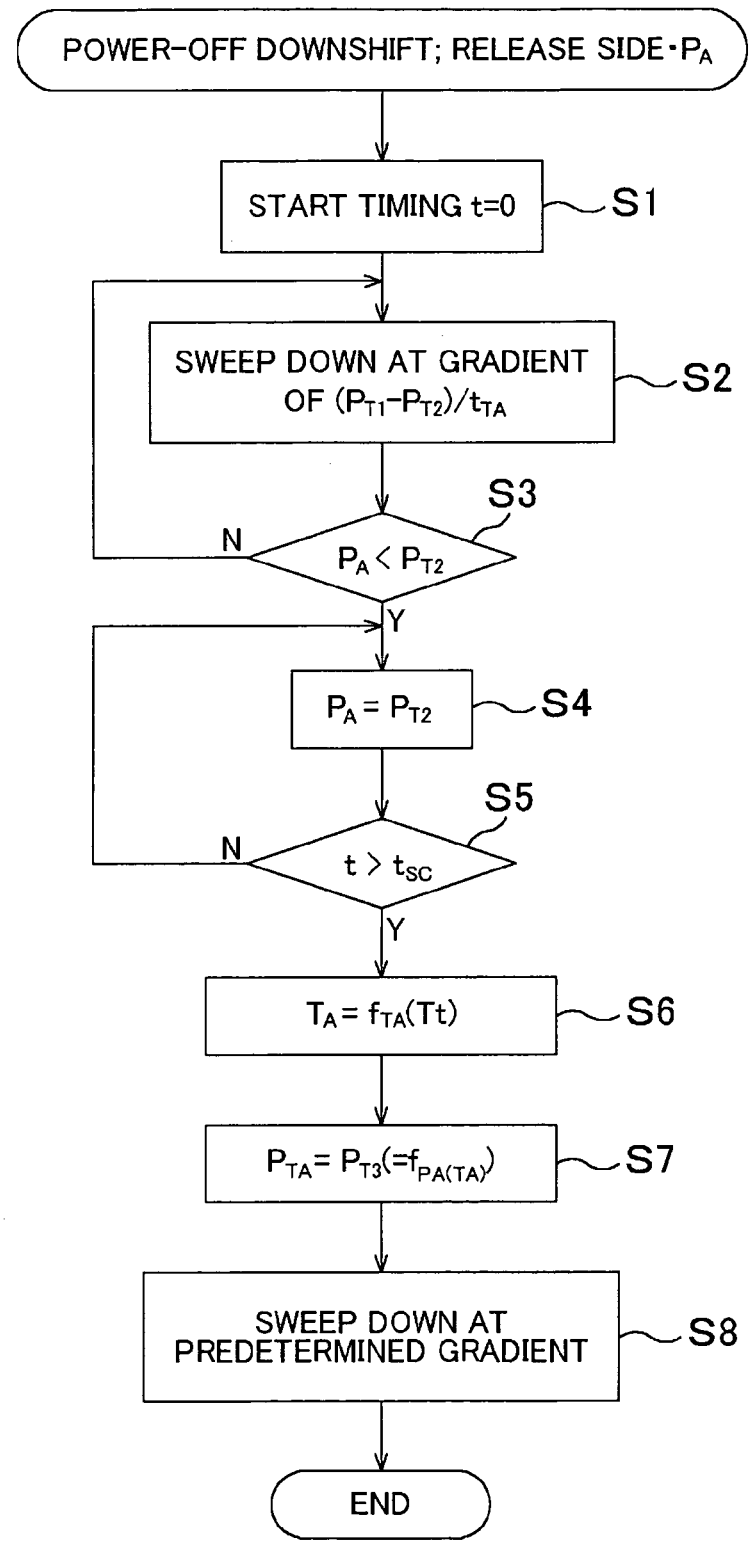
FIG. 7 is a flowchart of a routine for release side hydraulic pressure control.

FIG. 5 shows a clutch-to-clutch downshift that controls the release side hydraulic pressure shown in FIG. 7. FIG. 6 shows a released state with the one-way clutch rotating freely, without the release side control shown in FIG. 7. In FIG. 6, the release side hydraulic pressure PA is such that the apply pressure drains at the same time the shift control starts (in the drawing, this is the shift determination, but the time difference between the start of control and the shift determination is so slight that they are virtually the same. The lines in the drawing are also drawn so as not to overlap.). In FIG. 6 as well, the apply side control is also performed according to the flowchart shown in FIG. 8, similar to FIG. 5.

Further, because the shift is a downshift, the input shaft rotational speed (gear ratio speed) $N_{IN}$ would normally change based on the release side hydraulic pressure. However, because power is off and the input torque is small, the torque on the release side is also small, so in the input shaft rotational speed $N_{IN}$ actually increases based on feedback control of the apply side hydraulic pressure (S22).

Figure 9:
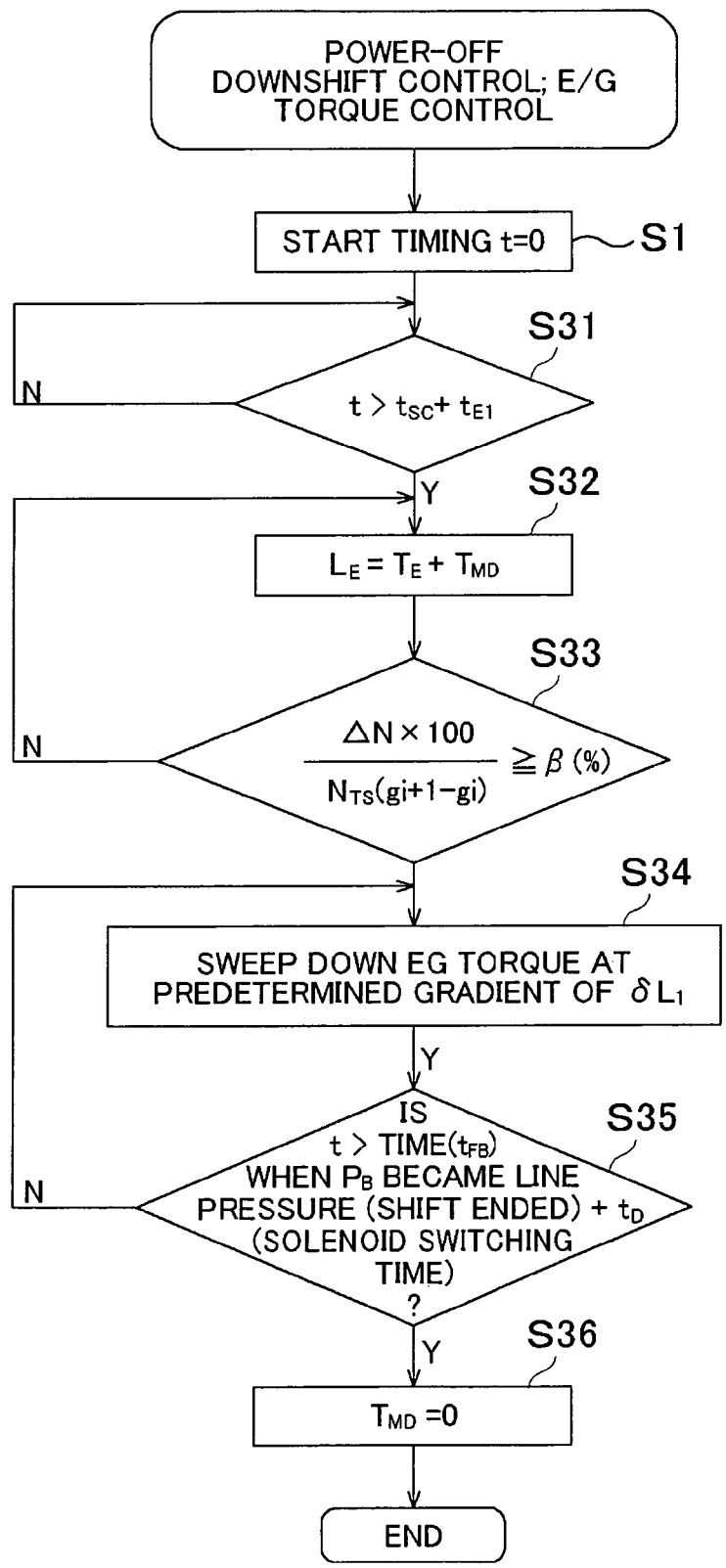
FIG. 9 is a flowchart of a routine for engine output (torque) control when release side hydraulic pressure control is executed.

Next, the engine output control when release side hydraulic pressure control is executed will be described with reference to FIGS. 5 and 9. Timing starts just as it does at the start of the hydraulic pressure control when shift control starts (S1). A delay timer is then started, with the start time $t_{SC}$ of the pressure decrease to the target hydraulic pressure $P_{T4}$ ($=P_{T3}$) of the release side control as a reference (S7), or the predetermined time $t_{SD}$ before the start of the hydraulic pressure increase $t_{SE}$ to the target hydraulic pressure $P_{TB}$ of the apply side control (i.e., $t_{SE}-t_{SD}$) as a reference X. Accordingly, engine output increase control is not started until after a predetermined delay time ($t_{SC}+t_{E1}$). That is, an engine control command is started in sync with timing in a direction that causes a change in the rotational speed of the input shaft due to release of the release side hydraulic pressure, or timing in a direction that causes a change in the rotational speed of the input shaft due to application of the apply side hydraulic pressure, i.e., a timing in a direction that actually causes a shift (S31). The time $t_{E1}$ of the delay timer is set to a positive or negative value depending on the responsiveness of the engine. That is, it is generally set to a positive value, but in an engine with poor responsiveness, it is set to a negative value so that the torque increase can also be output before the release on the release side.

Engine output (torque) control is then initiated at the point in time $t_{E1}$ of the delay timer as reference value Y. As shown in FIG. 5 (and FIG. 6), an engine torque (output) $T_E$ is controlled by a torque (output) increase request flag $F_E$ and a torque limitation (TRQ limitation) $L_E$. When raised, the torque increase request flag $F_E$ controls the engine torque $T_E$ so that it increases, and when lowered, the torque increase request flag $F_E$ controls the engine torque $T_E$ so that it decreases. In FIGS. 5 and 6, the flag is raised so the engine control unit 20 outputs a signal indicative of an increase to the electronic throttle system 28 (see FIG. 3).

The torque limitation $L_E$ restricts the engine torque. When the torque increase request flag $F_E$ is raised, the limitation value $L_E$ limits the increase in engine torque. Thus, a command for an increase in the engine torque, together with a maximum value $L_M$, i.e., the amount of torque increase $T_{MD}$, is issued according to the torque increase request flag $F_E$ and the torque limitation $L_E$. As a result, an amount of torque increase $M_D$ set beforehand according to the speed and the type of shift, such as a normal shift or a skip-shift, is added to the engine torque (S32). This engine torque increase control increases the engine torque to the maximum value $L_M$ according to the limitation $L_E$ at point in time Y, i.e., the end of the delay time $t_{E1}$, has passed as the reference to start the increase, as shown in FIGS. 5 and 6, and this value becomes the torque increase amount $T_{MD}$.

Then it is determined whether the degree of shift progression (e.g., 50%), which is based on the input shaft rotational speed $N_{IN}$ (gear speed), has reached a predetermined value $\beta$ (S33). That is, just as in the previous steps S21 and S23, it is determined whether $\Delta N \times 100)/N_{TS}(g_i+_1-g_i) \geq \beta$, where $\Delta N$ denotes the amount of change in the input shaft rotational speed, $N_{TS}$ denotes the output shaft rotational speed at the start of the shift, $g_i+_1$ denotes the gear ratio before the shift, and $g_i$ denotes the gear ratio after the shift. The torque increase value $T_{MD}$, which is limited by the torque limitation $L_E$, is maintained until the degree of shift progression has reached the predetermined value $\beta$ (e.g., 50%). If the degree of shift progression exceeds the predetermined value $\beta$, the point Z at which the degree of shift progression exceeded the predetermined value $\beta$ is made the reference time, and an engine control end timer $t_{EF}$ starts timing while the engine torque $T_E$ sweeps down (S34). This is done to reduce shock which would otherwise be caused by a sudden change in engine torque. The engine torque $T_E$, the upper limit value of which is limited by the limitation $L_E$, is swept down by reducing the torque limitation $L_E$.

The sweep down $\delta L_1$ of the torque limitation $L_E$ is maintained (S35) until passage of time which is the sum of a preset switching delay time $t_D$ of the solenoid valve, for example, and the time $t_{FB}$ (S26) at which a signal command is issued to make the apply side hydraulic pressure $P_B$ the apply pressure. If the sweep down $\delta L_1$ of the torque limitation $L_E$ decreases beyond the normal value that indicates a non-controlled state, the actual engine torque $T_E$ is not decreased past this normal value that indicates a non-controlled state, but rather is maintained at an engine torque increase amount of 0. This is because, even though the engine torque control is in the negative direction (i.e., a decrease), the torque increase request flag $F_E$ is raised in the increase direction. After the period of time passes in step S35 (i.e., $t > t_{FB}+t_D$), the amount of increase $T_{MD}$ of the engine torque $T_E$ is set to 0 (S36). That is, the value of the torque increase request flag $F_E$ becomes 0 and the torque limitation $L_E$ is on standby at a high value.

Figure 10:
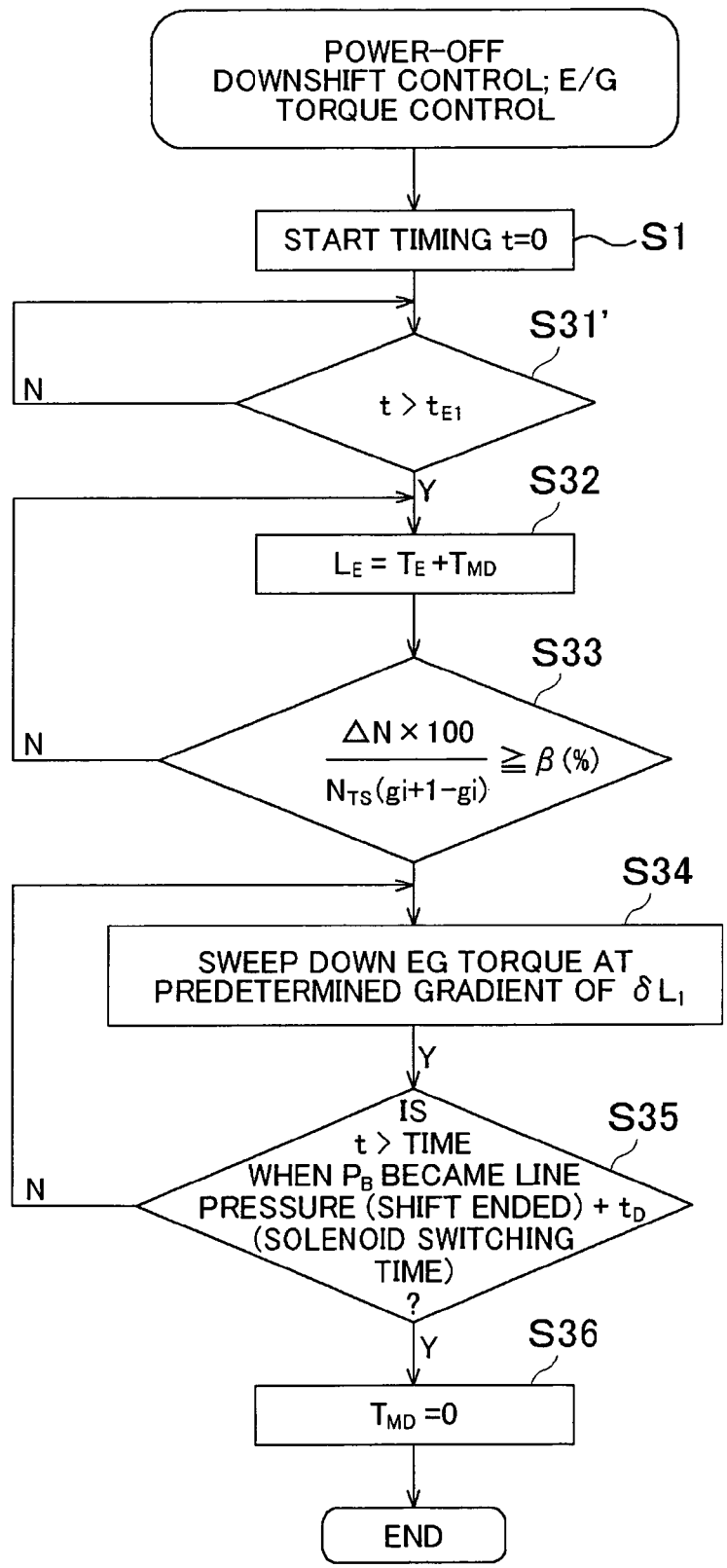
FIG. 10 is a flowchart of a routine for engine output control when the release side is a one-way clutch.

Next, a case in which release side hydraulic pressure control is not executed will be described with reference to FIGS. 6 and 10. With the one-way clutch, there is no decrease control to the target hydraulic pressure ($P_{T4}=P_{T3}$) of the release side hydraulic pressure, so there is no start reference time $t_{SC}(=t_{SE}-t_{SD})$. Therefore, the timer for starting the engine control starts timing at the point in time which is the start of shift control (S1). When a predetermined period of time $t_{E1}$ has elapsed (S31'), the increase control for the engine torque $T_E$ starts. The predetermined period of time $t_{E1}$ measured by the timer is set in advance so as to add a delay time $t_{E1}$ from the start of control of decrease to the target hydraulic pressure ($P_{T3}$) of the release side hydraulic pressure when release side hydraulic pressure control is executed (S8), i.e., from point X. The engine control thereafter is the same as that (i.e., S32, S33, S34, S35, and S36) described for the case when release side hydraulic pressure control is executed, so those steps are denoted by the same reference numerals and description thereof will not be repeated.

The delay time $t_{E1}$ and the amount of engine torque increase $T_{MD}$ are set beforehand according to the type of shift (i.e., shift type). FIG. 11 shows a specific example of a map which has been set beforehand. During a normal downshift from 3rd to 2nd or 4th to 3rd, the delay time $t_{E1}$ is 250 msec. With a skip-shift from 4th to 2nd, however, the delay time $t_{E1}$ decreases to 150 msec to match the stroke control of the apply side and the release timing of the release side. This is because the capacity of the hydraulic servo of the element to be applied and the element to be released in each shift is different, and because of need to match the piston stroke of each element. Also, the amount of torque increase $T_{MD}$ is set through testing to achieve a smooth feeling such that in a 3rd to 2nd downshift, the torque increase amount $T_{MD}$ is 100 Nm, and in a 4th to 3rd downshift, the torque increase amount $T_{MD}$ is 70 Nm. The amount of torque increase amount $T_{MD}$ may also be set high on the low gear side so that torque is obtained to match the rotational speed, which is based on the gear ratio, of the input shaft driven by the torque from the wheel side. Further, in a 4th to 2nd skip-shift, the amount of torque increase $T_{MD}$ may be set small, i.e., 50 Nm. Accordingly, in a skip-shift, the engine torque control is performed early. However, control can also be performed so as to both quickly progress through the shift as well as avoid causing a sense of discomfort due to an abrupt increase in engine speed by setting the torque increase amount too low.

The map shown in FIG. 11 is merely an example, i.e., other sets of values (other maps) may be used. Also, at this time in a skip-shift, for example, it is possible to set the torque increase to a large amount and the delay time to a long period to match the shift of the speed into which the transmission is to be shifted, for example, for different reasons than those stated above. Further, the map is not limited to three types of shifts. Alternatively, other types of shifts, such as a 5th to 4th, 5th to 3rd, 5th to 2nd, 4th to 1st, 3rd to 1st, and 2nd to 1st, may also be set. In addition, an automatic shift responsive to downhill coasting and a downshift by operation of a shift lever or a manual operating device may be set separately. Further, the automatic transmission is not limited to the automatic transmission described in the foregoing embodiment. The present invention can similarly be applied to a transmission having a different type of gear train.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A shift control apparatus for an automatic transmission having an input shaft connected to an engine and which downshifts in a power-off state in which an accelerator opening is substantially zero, comprising:
    an engine control unit which increases torque output of the engine by a predetermined amount after lapse of a predetermined period of time after the start of the downshift;
    a plurality of engine output increase control maps which differ depending on the type of the downshift; and
    a recognition unit which recognizes the type of the downshift; and
    wherein the downshift is performed by releasing a frictional engagement element by release control of release side hydraulic pressure, and applying a frictional engagement element by apply control of apply side hydraulic pressure;
    wherein the plurality of engine output increase control maps are stored in the engine control unit, the engine output increase control maps differing depending on the type of the downshift and having different predetermined periods of time for starting the engine output control and different predetermined amounts of torque increase in engine output correlated with the different types of downshift, wherein the amounts of torque increase are predetermined based on rotational speed of the input shaft, which rotational speed is based on gear ratio, and wherein the times for starting the engine output control are set to match the end of a predetermined delay time for reduction in release side hydraulic pressure following the start of shift control; and
    wherein the engine control unit selects and executes one of the stored engine output increase control maps according to the downshift recognized by the recognition unit.

2. The shift control apparatus for an automatic transmission according to claim 1, wherein the different stored engine output increase control maps include a control map corresponding to a normal downshift of one speed at a time and a control map corresponding to a skip-downshift of two or more speeds at a time.

3. A shift control apparatus for an automatic transmission having an input shaft connected to an engine and which downshifts in a power-off state in which an accelerator opening is substantially zero, comprising:
    an engine control unit which increases engine torque a predetermined amount after lapse of a predetermined period of time after the start of the downshift; and
    a recognition unit which recognizes the type of the downshift,
    wherein the downshift is performed by releasing a predetermines rotary element from engagement by a one-way clutch, and applying a frictional engagement element by apply control of apply side hydraulic pressure;
    wherein a plurality of engine output increase control maps are stored in the engine control unit, the engine output increase control maps differing depending on the type of the downshift and having different predetermined periods of time for starting the engine output control and different predetermined amounts of torque increase in engine output correlated with the different types of downshift, wherein the amounts of torque increase are predetermined based on rotational speed of the input shaft, which rotational speed is based on gear ratio, and wherein the times for starting the engine output control are set to match the end of a predetermined delay time for reduction in release side hydraulic pressure following the start of shift control; and wherein the engine control unit selects and executes one of the stored engine output increase control maps according to the downshift recognized by the recognition unit.

4. The shift control apparatus for an automatic transmission according to claim 3, wherein the different stored engine output increase control maps include a control map corresponding to a normal downshift of one speed at a time and a control map corresponding to a skip-downshift of two or more speeds at a time.

5. The shift control apparatus for an automatic transmission according to claim 3, further comprising a sensor for detecting the rotational speed of the input shaft.

6. The shift control apparatus for an automatic transmission according to claim 1, further comprising a sensor for detecting the rotational speed of the input shaft.

7. The shift control apparatus for an automatic transmission according to claim 1, wherein the start of shift control occurs when the release side hydraulic pressure is dropped from a stand-by pressure ($P_{T2}$) at which there is no change in rotational speed of the input shaft to a pressure ($P_{T3}$) where the rotational speed of the input shaft starts to change; and wherein the start of engine output control starts an increase in engine torque output.

8. The shift control apparatus for an automatic transmission according to claim 3, wherein the start of shift control occurs when the release side hydraulic pressure is dropped from a stand-by pressure ($P_{T2}$) at which there is no change in rotational speed of the input shaft to a pressure ($P_{T3}$) where the rotational speed of the input shaft starts to change; and wherein the start of engine output control starts an increase in engine torque output.

\* \* \* \* \*